United States Patent Office 3,439,782
Patented Apr. 22, 1969

3,439,782
BRAKE HOLDER WITH THROTTLE RELEASE
Hiroshi Uda, Itami, Tadasu Irie, Toyonaka, and Kaname Doi, Ibaragi, Japan, assignors to Sumitomo Electric Industries, Ltd., Osaka, Japan, a company of Japan
Filed May 24, 1966, Ser. No. 552,588
Claims priority, application Japan, June 17, 1965, 40/36,295
U.S. Cl. 192—3        7 Claims

ABSTRACT OF THE DISCLOSURE

An automatic brake control for a motor vehicle wherein the parking brake is actuated by a motor preferably driven from the vehicle engine and controlled by an electric circuit having a plurality of switches arranged and constructed to engage the parking brake upon the vehicle coming to a stop (minimal to zero movement) with the throttle control in engine idle position. The motor is preferably pneumatically driven from the engine intake manifold. The switches include a vehicle movement detector switch which permits the parking brake to be engaged only during zero or minimal vehicle movement in either direction and is switched by induction from a magnetized rotor which rotates commensurate with the vehicle movement.

---

This invention relates to a method of automatic brake control for automobiles and apparatus therefor.

As is widely known, when starting the present day automobile on a slope, it is necessary to release the hand brake while accelerating so as to prevent the automobile from moving backward owing to the inclination of the road. This operation requires experienced skill and is often liable to give rise to engine stall or other troubles. Especially, many of the automobile accidents at railroad crossings are attributable to engine stall due to this difficulty. This operation constitutes a source of fatigue of the automobile driver who drives an automobile all day in urban areas.

One object of the present invention is to furnish a method of automatically effecting an appropriate control of the parking brake for the purpose of making an easy start on a slope which normally requires dexterity and which involves hazards as already mentioned and to alleviate the fatigue of the driver.

Another object of the present invention is to furnish a reliable apparatus for automatically effecting said appropriate control.

Now we will explain the contents of the present invention in detail, making reference to the appended drawings.

Figure 1:
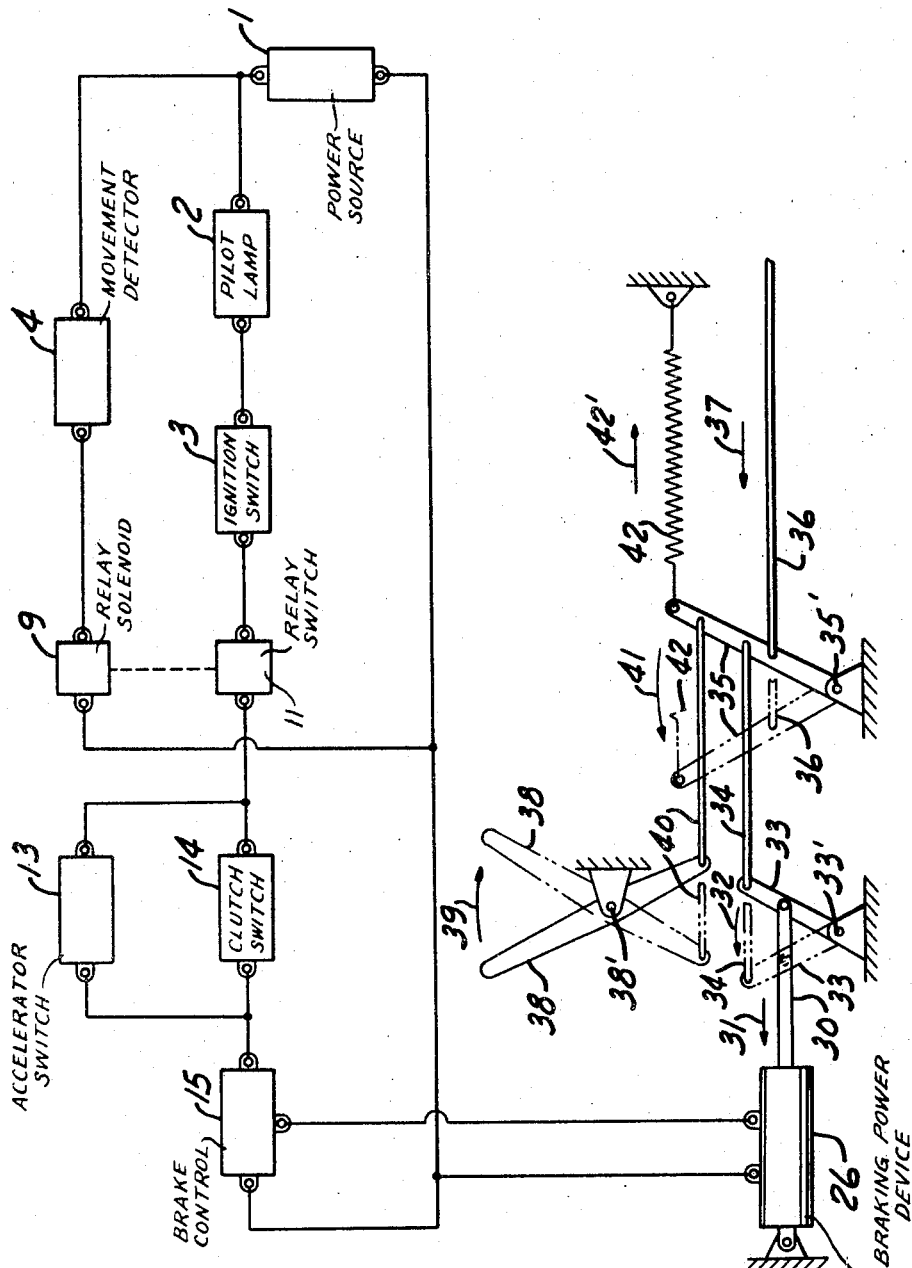
FIGURE 1 is a block diagram showing the operational principle of the method and apparatus of the present invention.

In FIGURE 1, 1 denotes the power source battery carried in the automobile; 2 a pilot lamp indicating that the device is in operation; 3 an engine gear switch functioning commonly to the ignition circuit of the engine and the circuit of the present device, which closes upon insertion of the key; 4 a drive detector to detect forward and backward movements of the automobile; 9 a relay, the switch 11 of 9 being opened when the drive detector 4 detects forward or backward movement of the automobile and the switch of 9 being closed when the forward or backward movement comes to a stop; 13 the accelerating pedal or throttle control switch installed detachably on a structure connected to it which is opened immediately before the engine is caused by the treading pressure applied to the accelerating pedal to begin acceleration from the idling revolutions; 14 a clutch switch placed in parallel with the accelerating pedal switch 13 and installed detachably on the clutch pedal or a structure connected to it and operating in response to a change in position or change in pressure of the clutch operating mechanism. The switch closes while the clutch is released or disengaged by the treading pressure on the clutch pedal and the switch opens the moment, or near the moment, the clutch is coupled or engaged. Its point of operation may be suitably adjusted. 15 denotes the brake control device for controlling the braking power device 26; 30 the traction rods of the braking power device; 34, 36 and 40 the braking cords or braking rods; 35 an intermediate lever revolving around 35' as the center; 38 the hand-operated parking brake lever, and 42 the return spring for releasing the brake. The braking power device may apply the braking force to the supplementary or parking brake using hydraulic force, positive force of air, negative force of air, electromagnetic force, etc. as a power source.

With the above-described device, the under-mentioned operation will be made in each driving condition of an automobile respectively.

(A) At the time of parking:

As the engine key is removed, the key switch 3 is open. Regardless of the operation of the accelerating pedal switch 13 and clutch switch 14, no electric current flows in the circuit of 1→2→3→9→13, 14→15→1. Therefore, although the braking power device 26 is deactivated, the parking brake is activated and prevents the forward and backward movements of the automobile, as the hand-operated parking brake lever 38 is pulled to the 39 side around 38' the center.

(B) At the time of starting the engine:

When the key is inserted in the key switch 3 to start the engine with the change lever or gear shift of the transmission in the neutral position, the key switch 3 closes and, as the automobile is at a stop, the drive detector is open and the switch of the relay 9 responding to it is closed. Therefore, as long as the accelerating pedal switch 13 is not opened by pressing the accelerating pedal, electric current flows in the circuit of 1→2→3→9→13→15→1, so that the braking power device 26 is activated. Together with the hand-operated parking brake lever 38, the brake cord 36 is pulled in the direction of the arrow 37 to activate the parking brake. Even when the braking lever 38 is moved from the direction 39 opposite to that shown with the arrow, the activated brake is not deactivated because of 26.

(C) At the time of starting the automobile (forward or backward):

When the clutch pedal is pressed and the transmission is positioned by the gear shift in first or low gear or a position desired by the driver as mentioned later, the switches 3, 9, and 14 are closed, so that electric current flows in the circuit of 1→2→3→9→14→15→1, no matter whether the accelerating pedal switch 13 is open or closed, and activates the braking power device 26. As already mentioned, the parking brake is not released to engage the clutch. Then, when the clutch pedal is gradually released and the accelerating pedal is pressed lightly or strongly, the clutch switch 14 is opened the moment the clutch is coupled. As the accelerating pedal switch 13 is now also open, the current which has been flowing in the circuit of 1→2→3→9→13, 14→15→1 is cut off and the brake control device 15 automatically deactivates the braking power device 26. The brake is released and the automobile initiates movement.

(D) At the time of driving (forward or backward):

As long as the automobile continues running, the switch of the relay 9 is opened by the action of the driving or movement detector 4, so that no electric current flows in the circuit of 1→2→3→9→13, 14→15→1, irrespective of the condition of the engine key switch 3, accelerating pedal switch 13 and clutch pedal switch 14. The braking power device 26 is not activated, therefore, and the parking brake will not interfere with the movement of the automobile.

(E) Temporary stop:

When the automobile is brought to a temporary stop by pressing the brake pedal with the engine revolving, the gear shift lever or transmission is normally put in the neutral position or it is in one of the forward or backward driving positions and the clutch pedal pressed down. If the accelerating pedal is put in the open condition in addition to the above, electric current will flow in the circuit of 1→2→3→9→13, 14→15→1 for the reason already mentioned and the braking power device 26 is activated, so that the parking brake automatically exercises braking effect. Even after the braking pedal is released, the brake (parking brake) continues braking the car until the accelerating pedal is again pressed for the operation described in paragraph C.

The function of the present invention is not affected detrimentally at all even if the pilot lamp 2 shown in FIGURE 1 is eliminated such that both ends are directly connected or shunted.

It does not affect the function of the present invention at all whether the drive detector 4 is installed in one of the revolving parts in the power transmission mechanism from behind the clutch device installed midway in the drive train between the engine and the driving wheel so as to detect both positive and reverse revolutions, or it is so arranged that it detects forward movement from the movement of the speedometer hand, fluid joint, oil pressure on the driven part of the fluid transmission, etc. and separately detects backward movement when the circuit for the back drive lamp is closed.

The accelerating pedal switch 13 and clutch pedal switch 14 can be opened and closed by displacement in the mechanism or a change in pressure, no matter whether their respective drive systems may be mechanical or hydraulic. With a car having a fluid transmission or torque converter, it is needless to say that 14 is unnecessary.

For the brake linkage mechanisms 34 and 40 connected from the braking power device 26 and the hand-operated brake lever 38, connecting rods, cords, or the like may be used. However, in order to enable 26 and 38 to work independently each from the other and also to work simultaneously without affecting the operation of the other, it is preferable to use a flexible material for 34 and 40.

Figure 2:
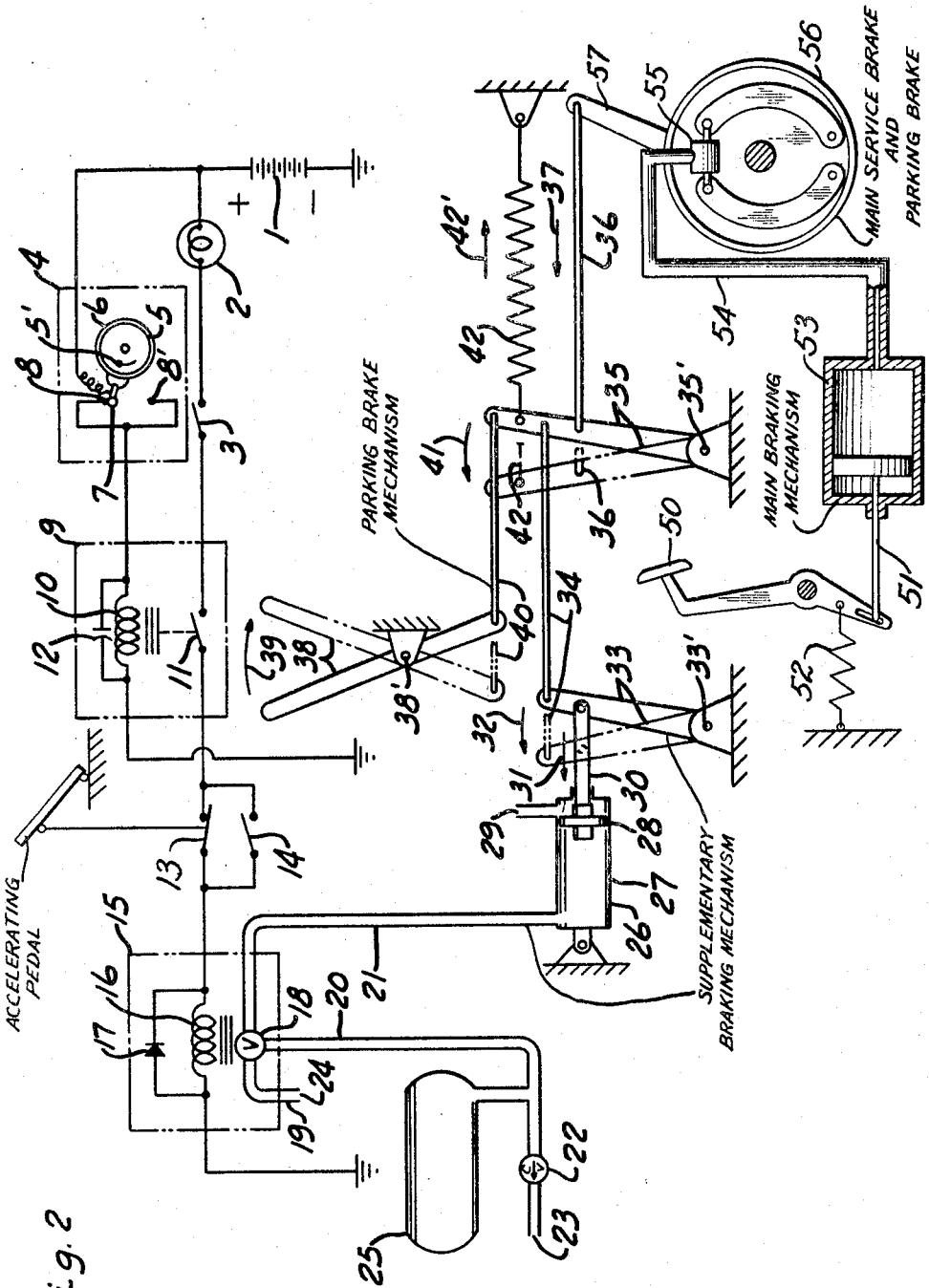
FIGURE 2 is a schematic diagram to explain the structure of an embodiment of the present invention.

FIGURE 2 illustrates an example of the application of the principle explained by FIGURE 1.

The main service braking for the vehicle may be provided by a conventional hydraulic main braking mechanism indicated in FIG. 2 which consists of the brake pedal 50, linkage brake rod 51, bias spring 52, hydraulic master brake cylinder 53, hydraulic supply line 54, and wheel cylinder 55 of the main service brake 56. A brake 56 is preferably or conventionally provided on each vehicle wheel (not shown).

The main service brake 56 also provides or also is the parking brake in this instance as it may be operated mechanically by lever 57, which is pivotally connected to rod 36 and which when pivoted will actuate wheel cylinder 55 independently of the main service braking mechanism. Of course, the parking brake may be provided separately from brake 56 such as by a conventional drive shaft parking or supplementary brake.

1 denotes the electric power source aboard the automobile and 2 a device to indicate and let the driver well realize that electric current is flowing in the electric circuit of 1→2→3→11→13, 14→16→1 and the automatic braking device of the present invention is in operation. It is positioned in such a location that the driver may recognize it readily. 4 denotes the revolution or movement detector for detecting the running condition of the automobile. It comprises a magnetized magnetic steel or rotor 5, a driven wheel 6 which is electro-magnetically induced by the revolution of said magnetic steel and is revolved to a prescribed angle accordingly, an electroconductive contact arm 7 which is electrically insulated from the driven wheel 6 and which is fixed thereto, and terminals 8 and 8′ which restrict the revolving movements of the driven wheel 6 and which connect the current from 1 by contact under pressure with the electroconductive arm 7. If the magnetic steel 5 revolves in the direction of the arrow 5′, the electro-conductive arm 7 contacts the terminal 8 and if it revolves in the direction opposite to that of the arrow 5′, the electroconductive arm 7 contacts the terminal 8′, thus causing electric current to flow in the circuit of 1→8, 8′→10→1. When the revolution of the magnetic steel 5 has stopped or come to an extremely low rate of revolution, then the electro-conductive arm 7 is brought to a neutral position midway between the terminals 8 and 8′ by an elastic body suitably fixed to the electro-conductive arm 7 or the driven wheel 6 and breaks the electric current in said circuit.

The revolution or movement detector 4 shown in FIGURE 2 is so constructed that it is installed in the part of the transmission where the flexible driving cord of the speedometer is inserted such that one end of the axle penetrating the center of the magnetic steel 5 and fixed thereto is attached to the revolving axle in the interior of the transmission and the other end to the flexible cord of the speedometer in a manner to make it freely attachable and detachable. However, as already stated when explaining the basic principle of the operation, it may be installed in any other suitable location.

9 denotes a relay which closes and opens a part of the electric circuit of 1→2→3→11→13, 14→16→1 in response to the opening and closing of the revolution detector 4 and consists of a coil 10, switch 11, condenser 12, etc. The switch 11 is opened and closed as electric current flows and stops through the coil 10. 12 is a delay device for the purpose of preventing the switch 11 from sensitively responding when the discontinuation and continuation of the electric circuit of the revolution detector 4 changes vibratorily.

The accelerating pedal switch 13 and clutch switch 14 are in conformity with what has been mentioned with regard to the basic principle shown in FIGURE 1. 15 denotes the brake control device and comprises a coil 16, bypass circuit 17 and switch valve 18. The switch valve or fluid control valve 18 connects the pipes 20 and 21 and closes 19 when electric current flows in the coil 16 and connects the pipes 19 and 21 and closes 20 when electric current does not flow in the coil 16. The bypass circuit 17 is provided so that when voltage across coil 16 has risen to a specified amount, current may pass through 17 and lower the voltage, lest the input side should get a high voltage and affect the other parts of the circuit the instant the current through the coil 16 is broken.

The electric circuit of 1→2→3→11→13, 14→16→1 is open and no current flows in it when the automobile is moving. However, electric current flows in the circuit of 1→8, 8′→10→1, except when the automobile is at a stop. Consequently, the consumption of the electric supply source is reduced by having it function with as little current as possible.

When the automobile is at a stop, if the gear shift is positioned in neutral and the key is inserted in the engine key switch to start the engine while the accelerating pedal remains unpressed, the engine key switch 3, relay switch 11 and accelerating pedal switch 13 are all closed, so that electric current flows in the circuit of 1→2→3→11→13→16→1 and the switch valve 18 connects the pipes 20 and 21 by the magnetization of the coil 16. As the other end 23 of the pipe or intake manifold 20 is connected to the suction pipe of the engine, it is kept under a negative pressure on an average at all times as long as the engine is revolving, so that the pressure inside 27 of the cylinder of the braking power device or fluid motor 26 becomes negative and the piston 28 and the traction rod 30 fixed to it are pulled in the direction 31, sucking in the atmospheric air at 29 at the same time. The pressure in the suction pipe of the engine continuously varies depending on the number of revolutions of the engine and the conditions of the load and may sometimes become positive. Consequently, in order to maintain the lowest possible pressure obtainable in the pipe 20 at all times, a check valve 22 is provided between the suction pipe or intake manifold of the engine and the switch valve 18, so that 20 and 23 may be connected only when pressure on the 20 side is lower than that on the 23 side and the difference in pressure exceeds the force of a spring provided in the check valve 22, they being separated from each other when pressure is higher on the 20 side than on the 23 side. 25 denotes a negative pressure tank which stores a negative pressure and is provided for the purpose of storing the negative pressure enrgy required to actuate 27 in a short length of time when the pipes 20 and 21 are connected by the action of the switch valve 18.

When the traction rod 30 of the braking power device 26 is pulled in the 31 direction, the lever 33 connected to it turns in the 32 direction with 33' as a fulcrum and pulls the intermediary cord 34. The intermediaty lever 36 connected to it turns in the 41 direction around the fulcrum 35' against the spring force 42' of the spring 42 to pull the braking cord 36 in the 37 direction, and the parking brake connected to 36 is thus activated and the automobile is braked.

Then, with the clutch pedal pressed and the gear shift positioned to any desired position and the accelerating pedal pressed in accordance with the driving conditions, the accelerating pedal switch 13 is opened. However since the clutch pedal switch 14 is closed, electric current continues flowing the circuit of 1→2→3→11→14→16→1, so that the switch valve 18 maintains the connection between the pipes 20 and 21 and the automobile remains in the same braked condition as before.

The moment the clutch is coupled or engaged upon adequately releasing the clutch pedal, the clutch switch 14 is opened and the current flowing in the circuit of 1→2→3→11→13→, 14→16→1 is broken. When the magnetism of the coil 16 disappears and the switch valve 18 connects the pipes 19, 21 and closes 20 at the same time. Atmospheric air flows into 27 through 21 to equalize pressures on both sides of the piston 28. Because of the force of the spring 42, the piston 28 is pulled in the direction opposite to that of the arrow 31 through the media of 35, 34, 33 and 30. The brake thus losing its braking force permits the automobile to move forward or backward as directed.

While the automobile is moving, the driven wheel 6 rotatably installed concentrically with the magnet 5 is electromagnetically induced by the revolutions of magnet 5 in the 5' direction or the opposite direction since the magnet 5 is coupled detachably with a revolving part connected with the forward and backward movement of the automobile. The driven wheel arm 7, which is an electric conductor electrically insulated from and fixed to the driven wheel 6, contacts the terminal 8 when the magnet 5 revolves in the 5' direction and contacts the terminal 8' when it revolves in the direction opposite to the 5' direction, so that electric current flows in the circuit of 1→7→8, 8'→10→1 and the switch 11 is opened by the magnetic force of the coil 11. While the automobile is running, therefore, electric current does not flow in the circuit of 1→2→3→11→13, 14→16→1, no matter whether the engine key is removed or not, or whether the clutch pedal and accelerating pedal are pressed or released, so that the braking power device 26 is not activated and the brake does not acquire any braking force. When the gear shift is shifted to the neutral position as the automobile comes to or approaches a stop and the clutch pedal and the brake pedal are pressed, the revolution of the magnet 5 of the revolution detector 4 discontinues or approaches low revolutions and the driven wheel 6 is deactivated. The driven wheel arm 7 is positioned midway between the terminals 8 and 8' by means of a restoration mechanism suitably provided on the driven wheel 6 or driven wheel arm 7. Current in the circuit of 1→7→8, 8'→10→1 is thus broken and the magnetic force of the coil 10 disappears. As the relay switch 11 is thus closed, electric current comes to flow in the circuit of 1→2→3→11→14→16→1. If the clutch pedal as well as the accelerating pedal is released, the clutch pedal switch 14 is opened but the accelerating pedal switch is closed, so that electric current comes to flow in the circuit of 1→2→3→11→13→16→1 and the switch valve 18 connects the pipes 20 and 21 because of the magnetization of the coil 16. Thus the braking cord 36 is again pulled in the 37 direction, when the brake acquires braking force and is braked. Thus the performance of the embodiment shown in FIGURE 2 is entirely equivalent to that of the basic principle shown in FIGURE 1.

Figure 3:
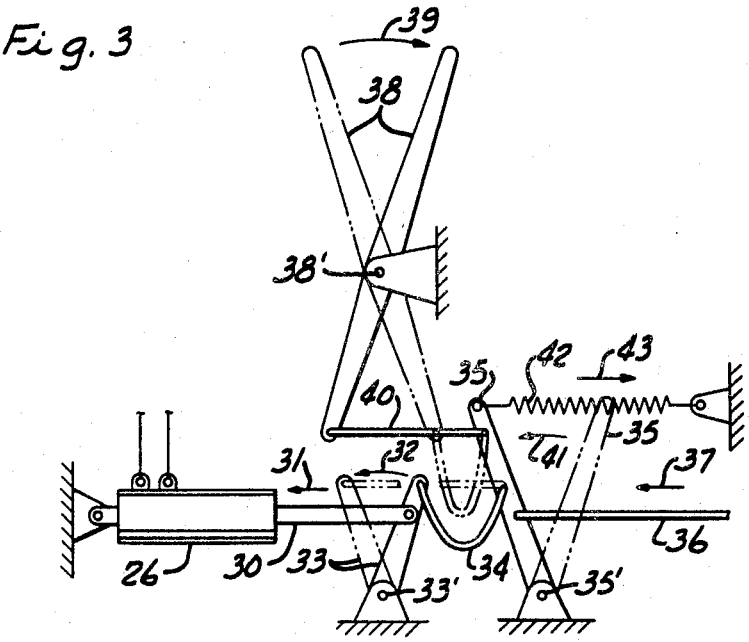
FIGURE 3 and FIGURE 4 are diagrammatic views showing examples of the structure of the hand brake lever portion of the automatic brake according to the present invention.
Figure 4:
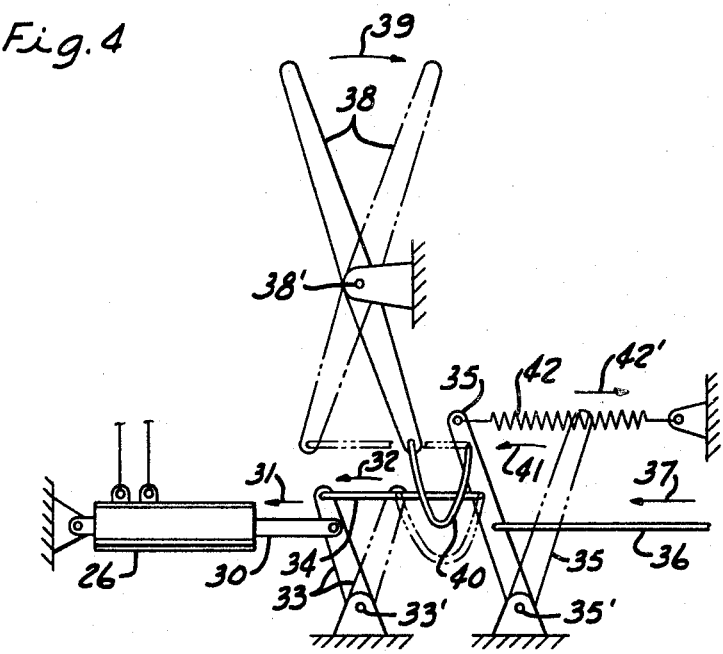

FIGURE 3 and FIGURE 4 show examples of an embodiment wherein the hand-operated braking system of the conventional type and the automatically controlled braking system of the present invention can effectively operate without affecting each other detrimentally and without necessitating any change in the driving practice heretofore observed.

FIGURE 3 shows a condition in which the hand-operated brake lever 38 is pulled to the 39 direction with 38' as the fulcrum while the braking power device 26 is deactivated and the traction rod 30 is in the position opposite to that of the arrow 31. By the operation of 38, the braking cord 36 is pulled in the 37 direction via the intermediary cord 30 and intermediary lever 35 to give a braking force to the brake. At this time, the intermediary cord 34 of the braking power device 26 bends as shown in the figure by virtue of its flexibility and does not interfere with the operation of the hand-operated brake lever.

FIGURE 4 shows a working condition opposite to that shown in FIGURE 3. When the hand-operated brake lever 38 is placed in the position to open the brake and the braking power device 26 is activated to pull the traction rod 30 in the 31 direction and pulls 36 to the direction of the arrow 37 via 33, 34 and 35 to impart braking force to the brake, the intermediary cord 40 bends as shown in the drawing by virtue of its flexibility and does not interfere with the operation of the braking power device 26.

It is obvious from FIGURE 3 and FIGURE 4 that braking by the hand-operated brake lever 38 and the braking power device 26 can be effected simultaneously.

As stated above, the handling of the hand-operated braking which calls for experienced skill can be made automatic and effective by the present invention. It is therefore possible to prevent accidents due to unwanted backward movement at the time of starting an automobile on a slope and accidents due to engine stalls. At the same time, it makes it no longer necessary to continue foot-braking while the automobile is at a stop on a slope or at an inter-section and to be troubled with manual braking. This results in a decrease in the driver's fatigue and contributes much to the safety of traffic.

We claim:
1. In a motor vehicle having an engine and a throttle control for said engine and a service brake and a supplementary brake, an automatic brake control comprising actuating means to actuate said supplementary brake, means for controlling said actuating means comprising a plurality of circuit closing means arranged and constructed to energize said supplementary brake upon said vehicle coming to a stop with said throttle control in engine idle position, characterized by a vehicle movement detector comprising a magnetized rotor mounted for rotation commensurate with the vehicle speed and direction of movement, and a movable contact biased to a neutral position and inductively coupled with said magnetized rotor for induced movement therewith from said neutral position to switch one of said circuit closing means.

2. In a motor vehicle having an engine and a throttle control for said engine and a main service brake and a main braking mechanism to operate said main service brake and a parking brake mechanically operable independently of said main braking mechanism, an automatic parking brake control comprising a closed loop series electric circuit including an electric power source and a first switch and a second switch and an electromagnet, first means to close said first switch only during the presence of zero to minimal movement of the vehicle, second means responsive to said throttle control to close said second switch only during engine idle throttle position, a fluid motor driven from the vehicle engine and operable to engage said parking brake independently of said main braking mechanism, a fluid control valve actuated by said electromagnet to energize and de-energize said fluid motor, said first means including a second closed loop electric series circuit having a solenoid operable to open said first switch upon energization and a power source and a fourth switch, and fourth means responsive to movement of the vehicle to open said fourth switch only during the presence of zero to minimal vehicle movement.

3. In a motor vehicle having an engine and a throttle control for said engine and a drive clutch in the drive train of said vehicle and a main service brake and a supplementary brake, and automatic brake control comprising a closed loop series electric circuit including an electric power source and a first switch and a second switch and an electromagnet, first means to close said first switch only during the presence of zero to minimal movement of the vehicle, second means responsive to said throttle control to close said second switch only during engine idle throttle position, a fluid motor driven from the vehicle engine and operable to engage said supplementary brake, and a fluid control valve actuated by said electromagnet to energize and de-energize said fluid motor, a third switch connected in parallel with said second switch, and third means responsive to said clutch to close said third switch only during disengagement of said clutch.

4. In a motor vehicle having an engine and a throttle control for said engine and a service brake and a supplementary brake, an automatic brake control comprising a closed loop series electric circuit including a power source and a first switch and a second switch and an electromagnet, first means to close said first switch only during the presence of zero to minimal movement of the vehicle, second means responsive to said throttle control to close said second switch only during engine idle throttle position, a fluid motor driven from the vehicle engine and operable to engage said supplementary brake, and a fluid control valve actuated by said electromagnet to energize and de-energize said fluid motor, said first means including a second closed loop electric series circuit including a solenoid operable to open said first switch upon energization and a power source and a fourth switch, and a magnetized rotor mounted for rotation commensurate with the vehicle speed and direction of movement, a movable contact biased to a neutral position and inductively coupled with said magnetized rotor for induced movement therewith from said neutral position to close said fourth switch.

5. The automatic brake control of claim 2 characterized by an ignition switch included in said series circuit.

6. The automatic brake control of claim 2 wherein said engine creates a pneumatic pressure source different from ambient, a conduit communicating said source with said fluid motor for actuation thereof, said fluid control valve disposed in said conduit, a check valve disposed in said conduit between said control valve and said source and operable to pass fluid in a direction compatible with said source, and a pressure storage tank communicating with said conduit between said check valve and said control valve.

7. The automatic brake control of claim 2 wherein said motor vehicle also includes a drive clutch and characterized by a third switch connected in parallel with said second switch, and third means responsive to said clutch to close said third switch only during disengagement of said clutch.

References Cited
UNITED STATES PATENTS

| | | |
|---|---|---|
| 2,079,978 | 5/1937 | Weiss. |
| 2,200,973 | 5/1940 | Struck. |
| 2,978,080 | 4/1961 | Beatty. |
| 2,843,235 | 7/1958 | Weaver. |
| 3,119,477 | 1/1964 | Ryder. |
| 2,266,213 | 12/1941 | Kattwinkel. |
| 2,277,584 | 3/1942 | Freeman _____ 192—.049 |
| 2,537,514 | 1/1951 | Curtiss. |
| 2,630,196 | 3/1953 | Weiss et al. |

FOREIGN PATENTS 762,245    1/1934    France.

BENJAMIN W. WYCHE III, *Primary Examiner.*

U.S. Cl. X.R.

188—152